United States Patent
Schmidt

(12) 
(10) Patent No.: US 9,022,768 B2
(45) Date of Patent: May 5, 2015

(54) VARIABLE DIAMETER, VARIABLE PITCH AUGER WITH MATERIAL SCRAPER AND BREAKER BAR

(76) Inventor: Norman G. Schmidt, Burnaby (CA)

(*) Notice: Subject to any disclaimer, the term of this patent is extended or adjusted under 35 U.S.C. 154(b) by 430 days.

(21) Appl. No.: 13/240,673

(22) Filed: Sep. 22, 2011

(65) Prior Publication Data

US 2012/0119408 A1 May 17, 2012

Related U.S. Application Data

(60) Provisional application No. 61/385,530, filed on Sep. 22, 2010.

(51) Int. Cl.
| | | |
|---|---|---|
| A21C 1/06 | (2006.01) | |
| A23G 3/34 | (2006.01) | |
| A21C 11/20 | (2006.01) | |
| A23P 1/08 | (2006.01) | |
| B29C 47/38 | (2006.01) | |
| B29C 47/60 | (2006.01) | |
| B29C 47/00 | (2006.01) | |

(52) U.S. Cl.
CPC .............. *A23G 3/0027* (2013.01); *A21C 11/20* (2013.01); *B29C 47/0016* (2013.01); *B29C 47/0019* (2013.01); *B29C 47/0023* (2013.01); *B29C 47/0066* (2013.01); *B29C 2793/009* (2013.01); *A23P 1/087* (2013.01); *B29C 47/38* (2013.01); *B29C 47/6012* (2013.01)

(58) Field of Classification Search
CPC .............. A21C 1/00; A21C 1/02; A21C 1/04; A21C 1/14; A21C 1/1405; A21C 1/141; A21C 1/145; A21C 3/04; A21C 3/10; A21C 5/006; A21C 11/16; A21C 11/20; A21C 47/0066

USPC .......... 425/200, 202, 207, 208, 238, 239, 145, 425/190, 308, 309, 315
See application file for complete search history.

(56) References Cited

U.S. PATENT DOCUMENTS

| | | | |
|---|---|---|---|
| 216,617 A | | 6/1879 | Jaquette |
| 3,457,880 A | * | 7/1969 | Eppenberger ................. 425/186 |
| 3,565,014 A | | 2/1971 | Mendoza et al. |
| 3,572,259 A | * | 3/1971 | Hayashi ......................... 425/132 |
| 4,217,083 A | * | 8/1980 | Machuque .................... 425/198 |
| 4,478,519 A | * | 10/1984 | Guibert ............................ 366/75 |
| 4,755,121 A | * | 7/1988 | Stefanati et al. .............. 425/239 |
| 4,792,294 A | * | 12/1988 | Mowli ............................... 418/9 |
| 4,844,935 A | * | 7/1989 | Fere et al. ...................... 426/549 |
| 4,938,127 A | * | 7/1990 | van Lengerich ................ 99/353 |

(Continued)

*Primary Examiner* — Seyed Masoud Malekzadeh
(74) *Attorney, Agent, or Firm* — Tangent Law Group, PLLC; Eric J. Weierstall, Esq.

(57) ABSTRACT

A multi stage auger system having a hopper with a first diameter opening tapering to a second smaller diameter opening, coupled to an auger tube at the second smaller diameter opening. An auger entry spiral with generally helical shape and a sweep arm coupled thereto, the spiral and the sweep arm skimming inside the product hopper to entrain the semi-solid materials from the hopper wall and, through the shape of the spiral, moving materials through the hopper from the first opening towards the second smaller opening. During this entrainment and movement by the spiral and sweep arm a space is left between the spiral and the sweep arm to remove air and voids from the semi-solid material through the movement. The auger has a first coarse pitch providing further removal of air/void spaces and a second finer pitch providing further movement under higher pressures near an exit of the auger.

21 Claims, 18 Drawing Sheets

(56) References Cited

U.S. PATENT DOCUMENTS

| | | | | |
|---|---|---|---|---|
| 4,949,628 A | * | 8/1990 | van Lengerich | 99/353 |
| 4,951,494 A | | 8/1990 | D'Alterio | |
| 4,957,041 A | * | 9/1990 | van Lengerich | 99/353 |
| 4,957,042 A | * | 9/1990 | van Lengerich | 99/353 |
| 4,960,043 A | * | 10/1990 | van Lengerich | 99/353 |
| 4,960,601 A | * | 10/1990 | Cummins | 426/504 |
| 5,201,441 A | | 4/1993 | Hoppe et al. | |
| 5,516,011 A | | 5/1996 | Fielding | |
| 5,733,583 A | | 3/1998 | Muller | |
| 5,840,345 A | * | 11/1998 | Ayash | 425/311 |
| 5,985,346 A | * | 11/1999 | Ayash | 426/496 |
| 6,053,097 A | * | 4/2000 | Suzuki | 99/450.2 |
| 6,645,542 B2 | * | 11/2003 | Nelles et al. | 426/582 |
| 6,997,597 B2 | * | 2/2006 | Drocco | 366/94 |
| 7,131,765 B2 | * | 11/2006 | Backhaus | 366/149 |
| 7,442,026 B2 | | 10/2008 | Shulski et al. | |
| 2001/0052372 A1 | * | 12/2001 | Hayashi et al. | 141/256 |
| 2002/0098255 A1 | * | 7/2002 | Ayash | 425/208 |
| 2004/0136263 A1 | * | 7/2004 | Backhaus | 366/291 |
| 2004/0191378 A1 | * | 9/2004 | Golby et al. | 426/502 |
| 2004/0213078 A1 | * | 10/2004 | Drocco | 366/94 |
| 2005/0257692 A1 | | 11/2005 | Marcato | |
| 2009/0263551 A1 | * | 10/2009 | Van Praag et al. | 426/519 |

\* cited by examiner

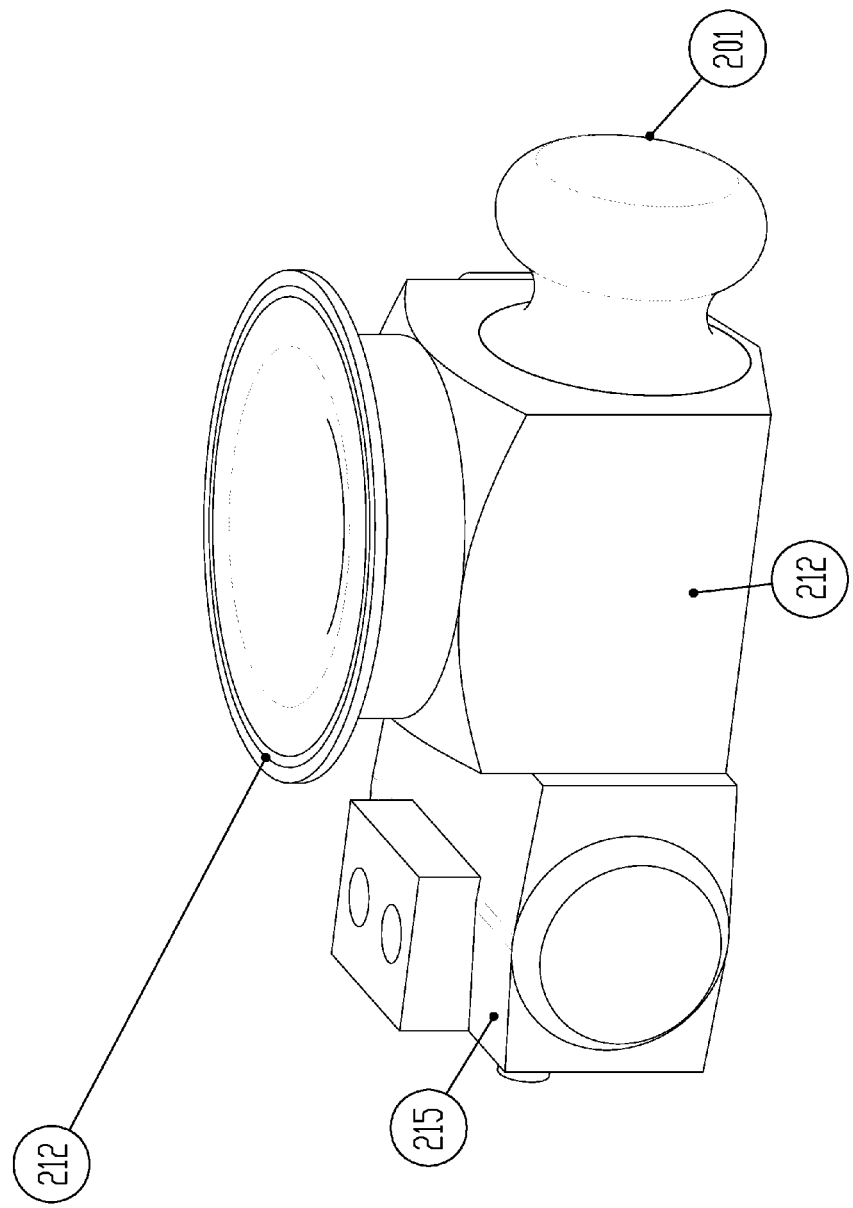
Figure 6A1

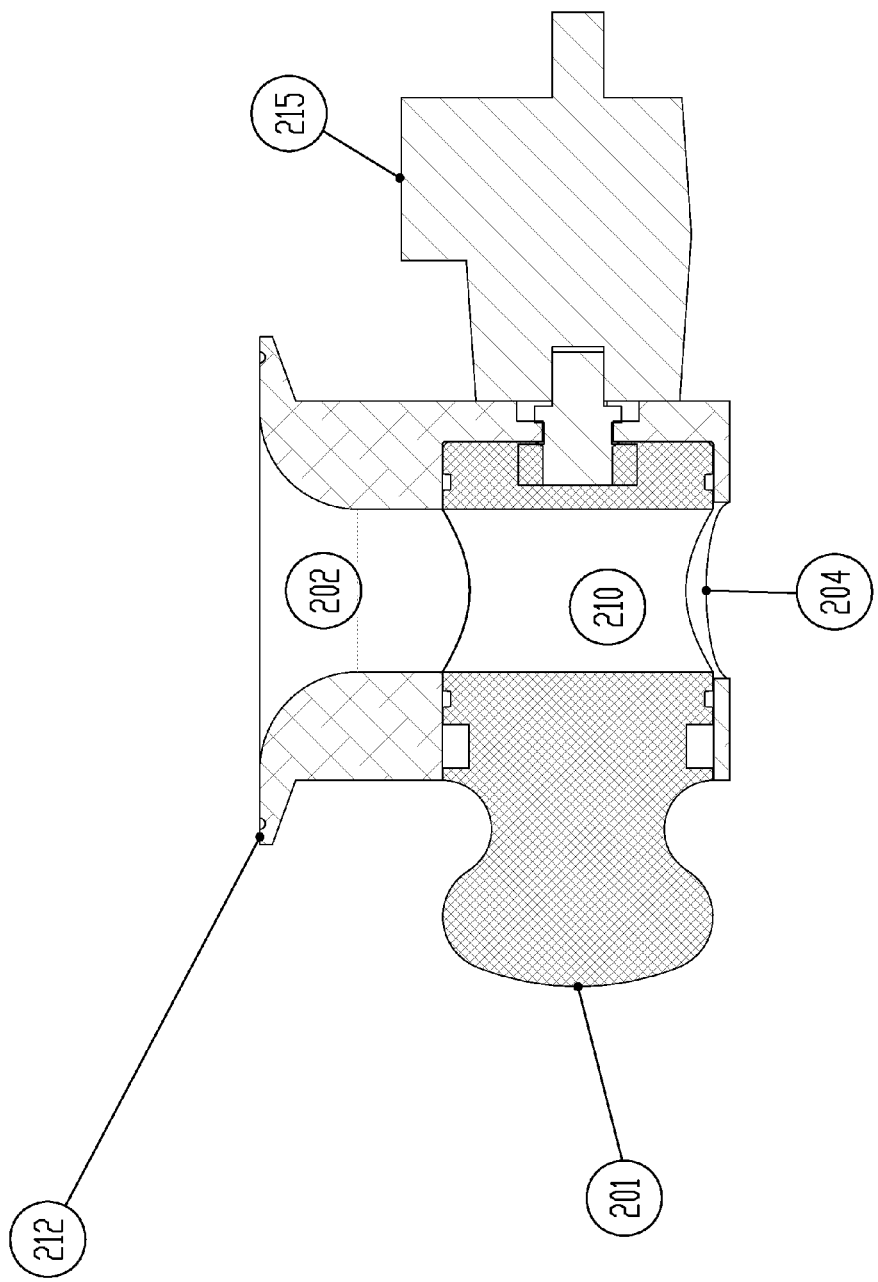
Figure 6A2

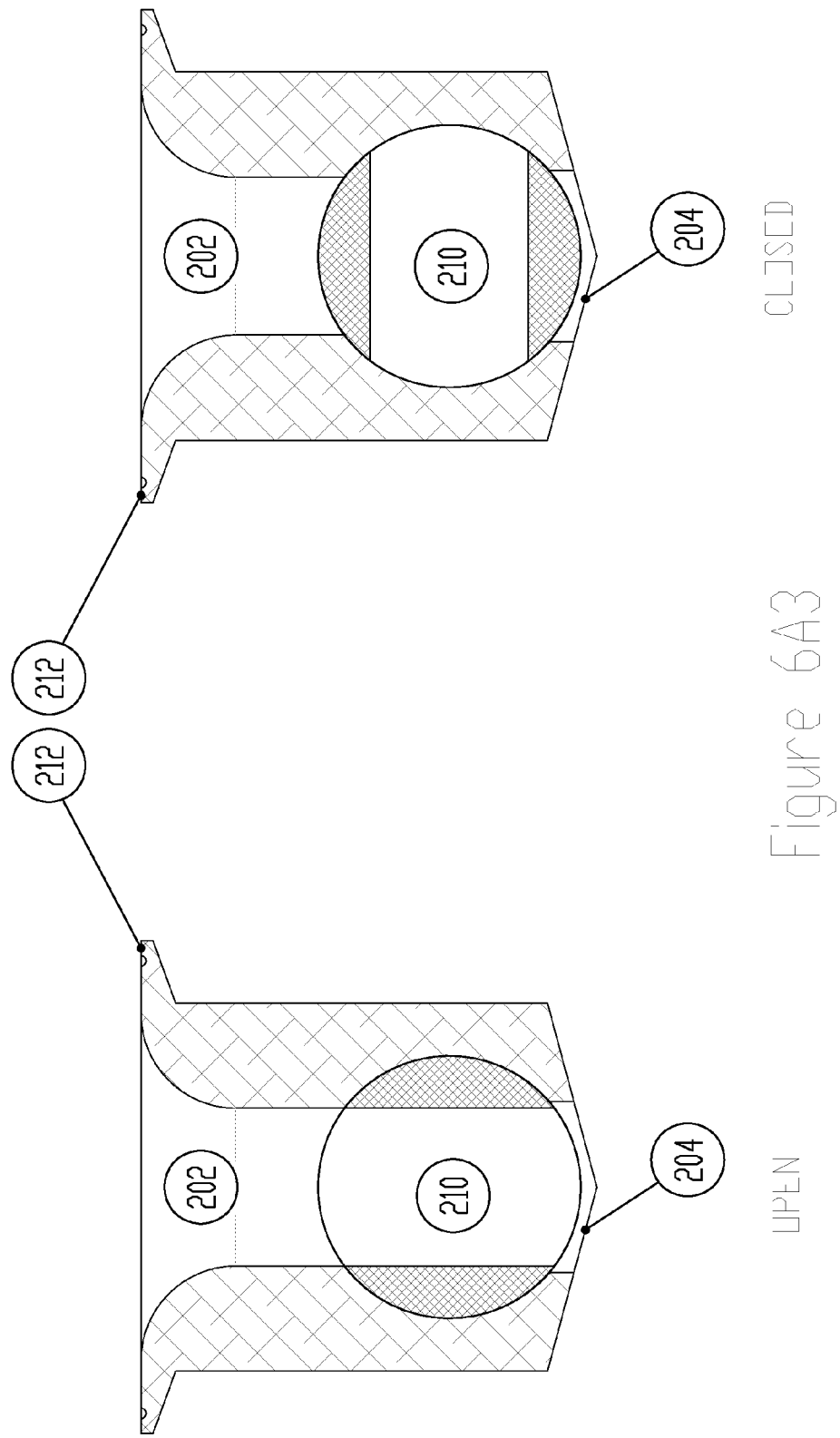

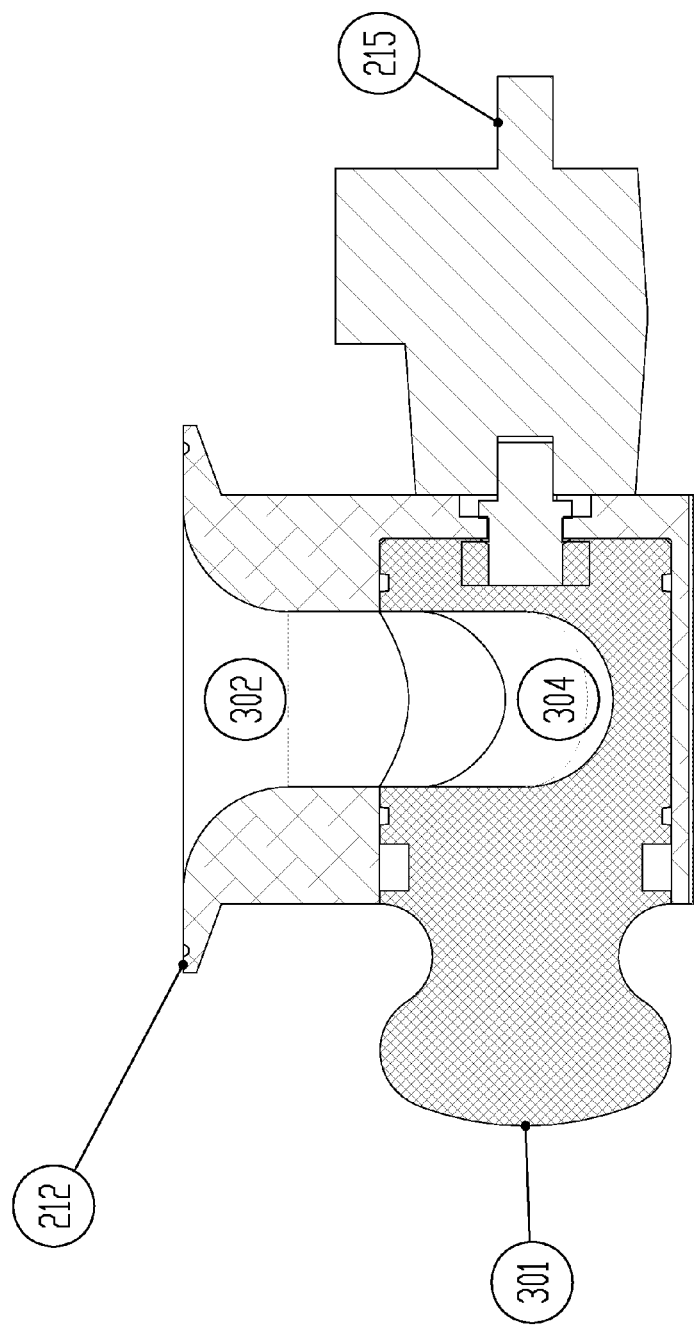
Figure 6B2

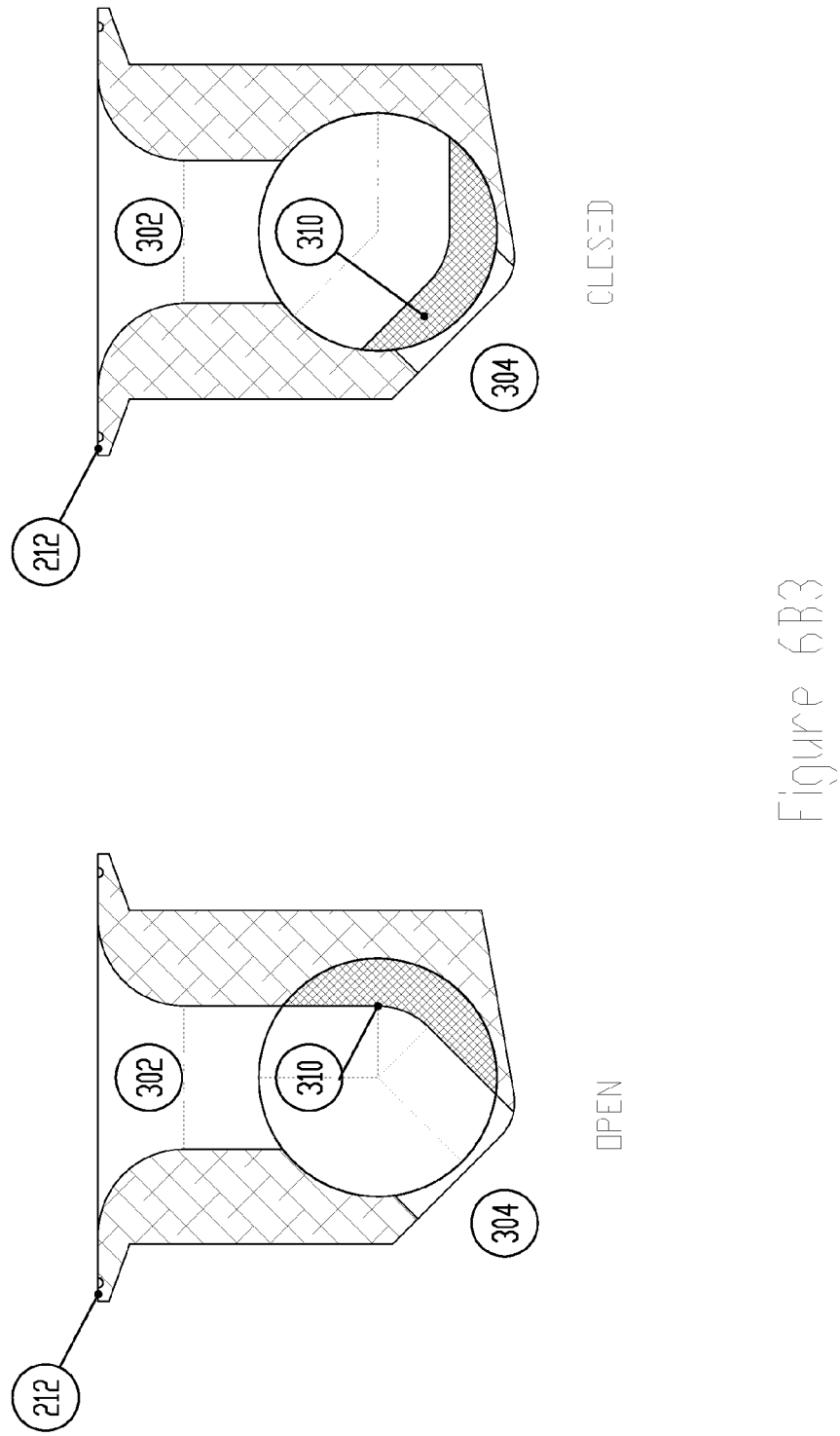

VARIABLE DIAMETER, VARIABLE PITCH AUGER WITH MATERIAL SCRAPER AND BREAKER BAR

CROSS-REFERENCE TO RELATED APPLICATIONS

This application claims the priority of U.S. provisional patent application 61/385,530, filed Sep. 22, 2010, which is incorporated herein by reference.

BACKGROUND OF THE INVENTION

Often materials such as mixed plastics or food products need to be fed or filled into machines or materials may need to be extruded out in the form of strips or long shapes. For example, plastics like urethane mixes with fillers that need to be extruded into a round long cylinder then cut into plugs or pieces so as to make corks to seal bottles. Another typical operation would be to take mixed cheese and use the device to extrude this cheese mix out to fill pepper shells or to extrude out mashed potatoes to be portioned out onto meal plates or into potato skins to make the typical dressed or flavored potatoes.

Presently machines exist to take raw feed stock and feed this material out under pressure but they are typically large and complicated using, for example, feed rollers in machines produced by Bpex Hutt, Minke, Baker Perkins, Spooner Vicars or rotary vane pumps such as those produced by Huntmann.

There are typically available augers that contain a helical profile that contains the medium to be moved by acting similar to a nut and bolt where the auger acts as a bolt or round threaded rod and the medium acts as the nut that upon rotation of the threaded rod (or as in this case the auger) the medium will move forward in a fashion similar to the way the nut moves forward on a bolt thread.

These types of augers also typically provide changes in pitches. This is typically a two-step change in pitch, from a coarse pitch to a finer pitch. A coarse pitch having a greater ability to carry larger amounts forward where a fine pitch will carry less medium forward per revolution but do so with an ability to generate a higher pressure.

Simple, single combinations of pitches have been used in the semi-solid food materials processing industry for example. The most common being a coarse pitch at the start of the auger device where medium may enter, then a longer fine pitch often on a separate auger. The coarse pitch is provided in a feed section where materials will enter but may have voids or air pockets in the semi-solid food material. For optimal, operation in food portioning where the medium is moved forward and discharged at a constant rate, it is imperative to not have voids or air pockets in the product. Often this air or void removal is done by coupling the coarse pitch auger to the fine pitch auger, so that where the coarse pitch meets the fine pitch the medium in the coarse pitch auger will tend to slow and stall or slip before entering the fine pitch auger that can only accept materials at a lower feed rate for the revolution speed of the augers. This is where thru this slippage of medium entering the fine pitch portion of the auger air is released and only medium is able to move forward.

There exists a need for improved throughput in a machine with more variables in the use of a conical hopper with a drive motor that simultaneously turns an agitator as well as a feed screw auger to improve throughput with various pitches that avoid slippage and slowdowns of the feed material while providing for the removal of void spaces and increasing portioning accuracy. Further, a need exists for an improved die and cutter assembly that is able to utilize both a cutting wire for use with soft and sticky materials as well as a cutting blade which can be used for stiffer materials.

BRIEF DESCRIPTION OF THE INVENTION

A first aspect of the invention is to provide an auger type device that combines the use of a conical hopper with a drive motor that simultaneously turns the agitator as well as the feed screw auger to increase throughput with a variable pitch auger having a first open section with a helical entrainment screw, a further coarse pitch section with a wider diameter, and a narrow fine pitch section to facilitate air and void removal.

Yet another aspect of the invention is to provide an auger that allows for quick and efficient removal of void space and air pockets in the material.

A further aspect of the invention provides a die which affords a size and shape to the extruded material as well as a cutter that is used to cut the continuous stream of extruded material into portions or pieces and is able to utilize both a cutting wire for use with soft and sticky materials, as well as a cutting blade which can be used for stiffer materials.

A still further aspect is the sweep augers driven in the same direction as the auger, which feeds or pushes the materials to the auger in a more continuous manner.

Another aspect is that the auger and the sweep arm are driven by the same drive, providing a smother more continuous flow of materials.

A still yet further aspect is a stationary breaker bar to prevent the rotation of the mass in the hopper which may accumulate and ball or otherwise travel with the motion of the sweeper and auger entry.

The invention includes an article of manufacture, an apparatus, a method for making the article, and a method for using the article.

The invention includes an apparatus, an auger system and a method of operating an auger.

The apparatus of the invention includes a multi stage auger system providing removal of air and void spaces from semi-solid materials that includes a motor coupled to an auger drive shaft and an electrical control panel with a product hopper with a first diameter opening tapering to a second smaller diameter opening and coupled to an auger tube at the second smaller diameter opening. An auger entry spiral with a generally helical shape and an at least one sweep arm coupled to the auger entry spiral and driven by the motor, the auger entry spiral and the at least one sweep arm skimming inside the product hopper to entrain the semi-solid materials from the hopper wall and, through the helical shape of the auger entry spiral, moving the semi-solid materials through the hopper from the first diameter opening towards the second smaller diameter opening in an auger entry area within the hopper. During this entrainment and movement by the auger entry spiral and at least one sweep arm there is a space left between the auger entry spiral and the at least one sweep arm to remove air and voids from the semi-solid material through the entrainment and movement. An auger is coupled to the auger entry spiral and the at least one sweep arm, the auger having a first section with a first coarse pitch providing further removal of air and void spaces through movement and agitation and a second finer pitch providing a further movement under higher pressures near an exit of the auger tube and a die member is also coupled to the exit of the auger tube.

A human machine interface (HMI) with a controller and memory storing an at least one program for operating the system can also be provided. The system can also include an at least one sensor input and at least one output in communication with the controller and displaying an at least one status of the system on the HMI. The HMI can be a touch screen. The at least one program for operating the system can further comprise an at least one of an at least one rotational speed, product description, production rate in cuts per minute, auger speed and counter function. The auger can be conical in the first section.

The system can comprise a reciprocating cutting mechanism. The reciprocating cutting mechanism can have a cutting blade. The system reciprocating cutting mechanism can have a cutting wire. The system can also have an at least one stationary breaker bar, where the semi-solid material being moved by the auger entry spiral and the at least one sweep arm is passed across the at least one stationary breaker bar.

The system can have a single motor that drives both the auger and the scraper bar. The scraper bar moves in the same direction as the auger. The scraper can be coupled to the auger. A cutting mechanism cutting portioned pieces of the semi-solid material after being extruded through the die member can be provided.

The cutting mechanism can be at least one of an at least one blade, an at least one wire, and an at least one valve cutter. The system can also comprise an exit nozzle coupled to the die.

The system can also include an at least one of a conveyor, a collection tray or a conveyor with collection trays. The breaker bar can also further assists in preventing clumping and attachment and further aids in removal of air from the medium prior to entrainment with the auger and further comprise at least one of multiple breaker bars, at least one breaker bar with extensions and a breaker bar with a cross sectional shaped profile.

The apparatus of the invention includes an auger processing semi-solid material with a cutting mechanism having a motor coupled to an auger drive shaft and an electrical control panel with a tapered product hopper with a first end and a second end, the second end having a smaller diameter than the first, and coupled to an auger tube at the second smaller end. An auger entry spiral is included with a generally helical shape and an at least one sweep arm coupled to the auger entry spiral and driven by the motor, the auger entry spiral and the at least one sweep arm providing movement of the semi-solid material into the auger tube. The auger is coupled to the auger entry spiral and the at least one sweep arm, the auger having a first section with a first coarse pitch providing a further movement from the auger entry spiral through the auger tube and a second finer pitch providing a further movement under higher pressures near an exit of the auger tube. A die member is coupled to the exit of the auger tube and a cutter assembly is mounted to the die member and having a cutter base with an at least one cutter slide and a cutter mount with an at least one cutter way, the at least one cutter slide moving within the at least one cutter way by the movement of the actuator, the movement of the actuator moving the cutter base below the die member to cut extruded semi-solid materials from the auger. A product collection device is provided collecting the cut extruded semi-solid material.

The product collection device can be at least one of a table, a conveyor, a tray and a conveyor with trays. The cutter assembly can further comprises a removable die member which may be exchanged for dies with differing shapes and extrusion sizes by lifting a die block from a die holder in the die member when the cutter assembly is removed from a bottom of the auger tube. The cutter assembly can also further comprise an at least one cutting blade and a cutting blade tensioner assembly. The cutting device can also further comprise a wire cutter tensioner, a wire mount capstan, a wire anchor and at least one cutting wire.

The method of the invention includes a method of operating an auger to process semi-solid materials. The method includes the steps of engaging a motor to drive an auger entry spiral with a generally helical shape and an at least one sweep arm coupled to the auger entry spiral and driven by the motor, feeding semi-solid materials to a product hopper which feeds the semi-solid materials to the auger entry spiral and the at least one sweep arm, skimming inside the product hopper and entraining the semi-solid materials from the hopper wall and, through the helical shape of the auger entry spiral, moving the semi-solid materials through the hopper from a first diameter opening towards a second smaller diameter opening in an auger entry area within the product hopper and during this entrainment and movement from the auger entry spiral and at least one sweep arm there is a space left between the auger entry spiral and the at least one sweep arm, removing air and voids from the semi-solid materials through the entrainment and movement, moving the semi-solid materials through an auger tube, the auger having a first section with a coarse pitch and a further section with a finer pitch, the pressure increasing in the material in the tube as the material is passed through the further section and dispensing the semi-solid material from the auger tube.

Moreover, the above aspects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the

BRIEF DESCRIPTION OF FIGURES

Embodiments of the invention are explained in greater detail by way of the drawings, where the same reference numerals refer to the same features.

FIG. 6A1 shows an isometric view of an exemplary embodiment of a rotary valve assembly where activation closes both the inlet and discharge ports.

FIG. 6A2 shows a side cut away of the embodiment of FIG. 6A1.

FIG. 6A3 shows an end cut away of the embodiment of FIG. 6A1.

FIG. 6B1 shows an isometric view of an exemplary embodiment of a rotary valve assembly where activation closes the discharge port and the inlet port remains open.

FIG. 6B2 shows a side cut away of rotary valve of FIG. 6B1.

FIG. 6B3 shows an end cut away of rotary valve of FIG. 6B1.

DETAILED DESCRIPTION OF THE INSTANT INVENTION

The exemplary embodiment of the instant invention is shown as a four way auger combination of a spiral arm that skims the side of the hopper to scrape the hopper wall then with the helix of the spiral arm the medium is to be brought down towards the opening of the auger entry area. This helix in the spiral arm is also open so as to try to bring down medium but also bring it down in such a manner so that air may escape while it is brought down. Once the material comes down to the auger entry point it is taken into the coarse pitch area of the auger and then carried down to the fine pitch area of the lower auger section. The upper auger being both larger in diameter as well as coarse in pitch, which provides a double change in pitch going from coarse large diameter to finer small diameter. By doing this in a two fold change in the passage of the medium, it improves the removal of air in the auger in a more ideal manner, rather than leaving the air removal to the point at which the medium "backs up" as it passes into the fine pitch auger from the coarse auger. Additionally, by making the pitch change go from an open volute spiral arm then into a large open auger then to the fine pitch auger the device is providing the greatest possible avenue for the removal of this entrained air.

A further aspect adds an attached sweeper arm that is driven with the auger drive to synchronize the speed with the volume changes. In this case the hopper diameter was designed or set in size so as to match the action of the sweep arm so that the sweep arm still entrains the medium and feeds it to the auger entry port but so that it does not over feed or underfeed the auger entry port and further assists in maintaining the product flow and air pocket removal before the point of entry into the necked down auger portion. Yet another aspect of the exemplary embodiment shown is the breaker bar. With devices that typically employ hoppers with an auger and sweep arms, the sweep arms are typically driven in the opposite direction as to the rotation of the auger so as to avoid spinning of the mass in the hopper. In this device the breaker bar is added so as to reduce the possibility of the mass of medium to adhere to the rotating components and start to spin with these components and thereby stop the movement of the medium down and thru the system. Thus the scraper bar rotates with the auger driven from the same drive and the breaker bar remains stationary.

Figure 1:
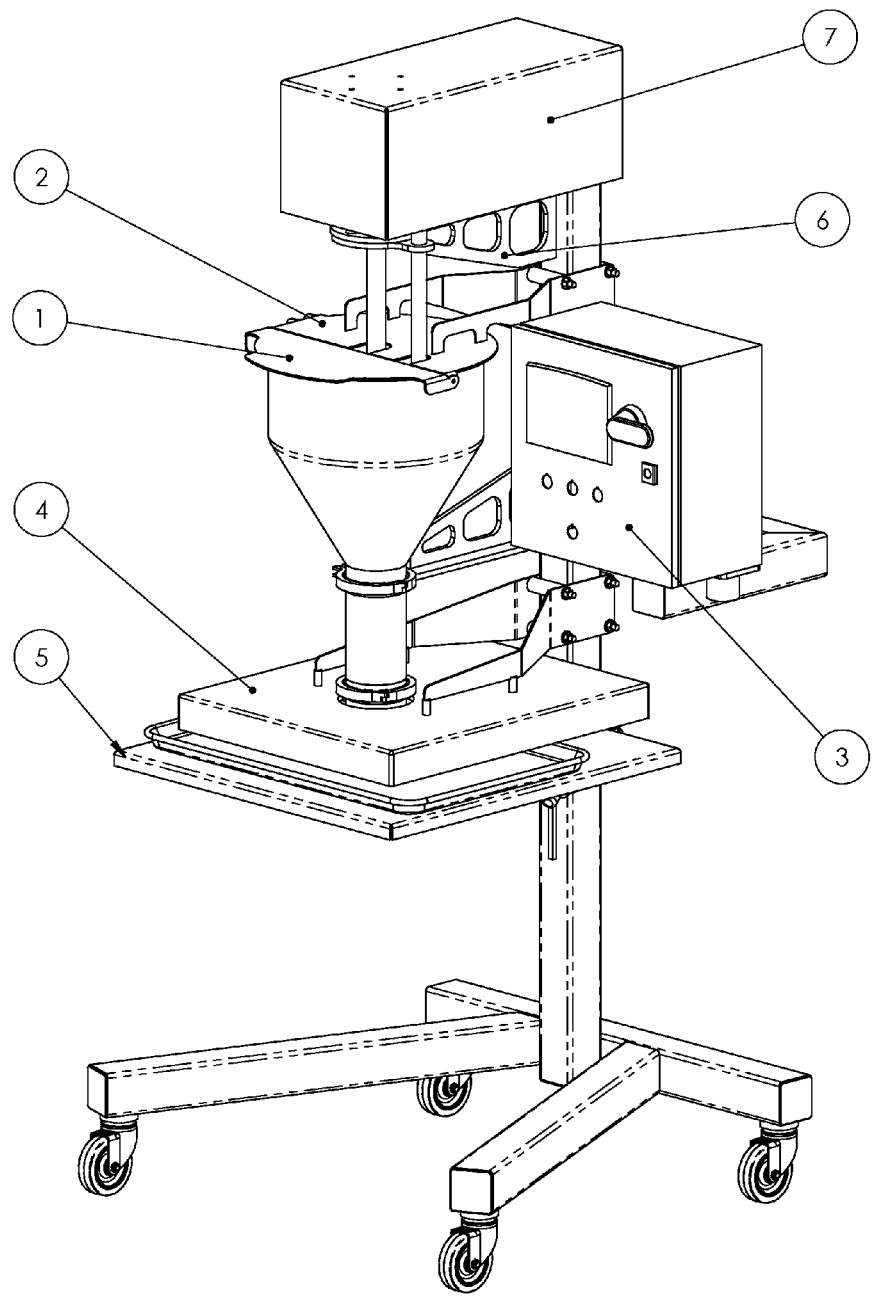
FIG. 1 shows an isometric view of an exemplary embodiment of the instant invention with frame, material holding hopper, electrical control panel, and portion receiving table with guard above the portion receiving table.
Figure 2:
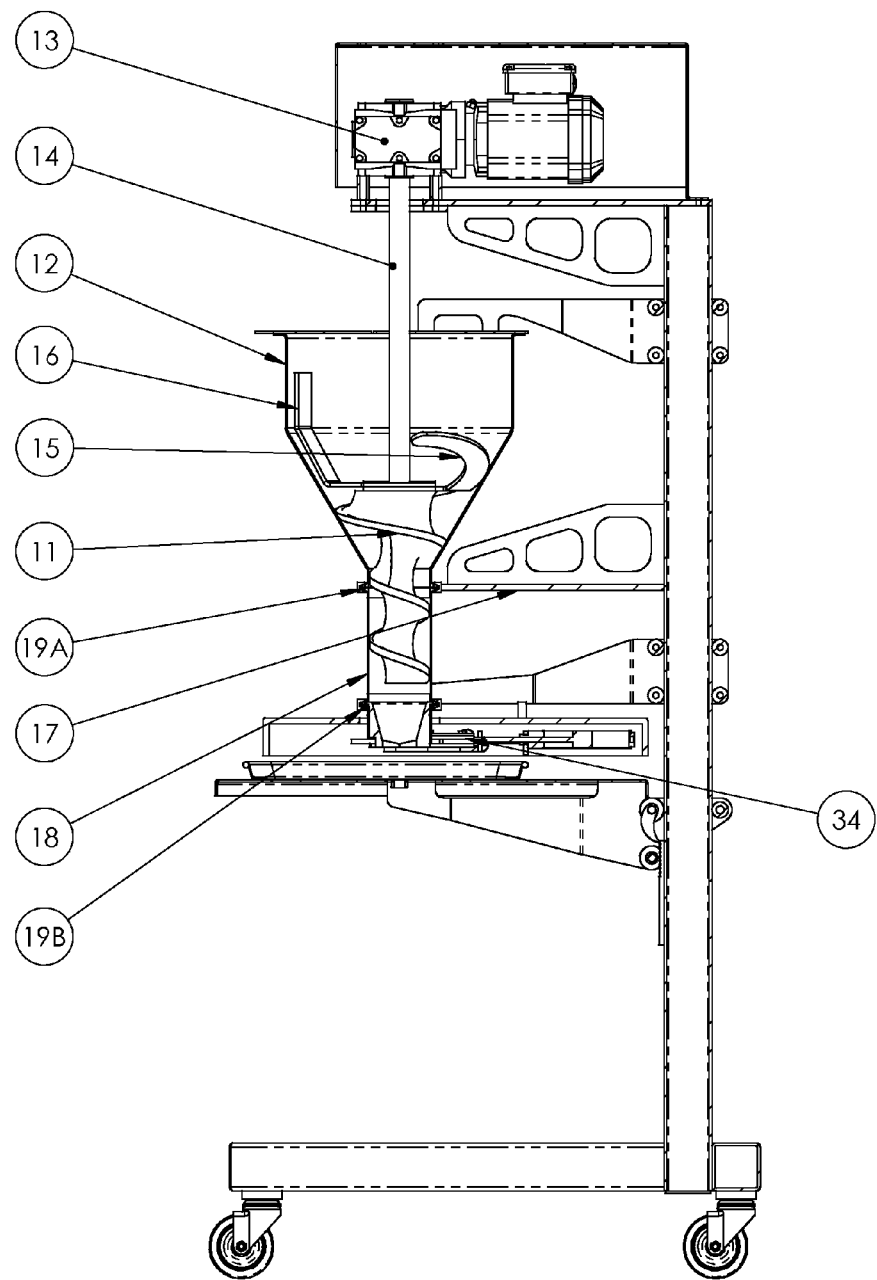
FIG. 2 shows a side view with cut away of the hopper, drive motor, auger shaft, Auger, auger feed volute spiral, hopper scraper, receiving table with cutter assembly and frame that supports the components.
Figure 2A:
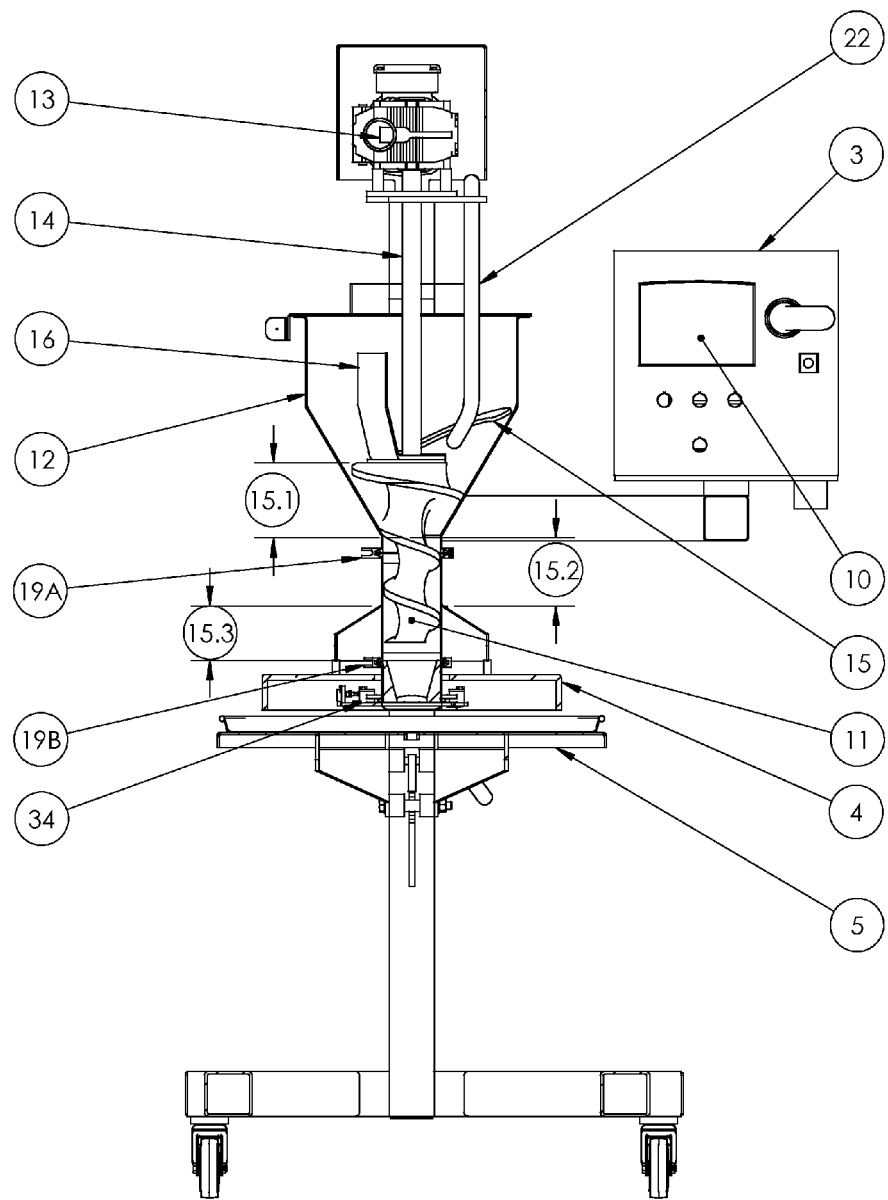
FIG. 2A shows a front view with cut away of parts noted in FIG. 2

FIGS. 1, 2, and 2A show an isometric assembled view, a side view with cut away of the hopper and a front view with cut away of an exemplary embodiment of the invention. The exemplary embodiment of the instant invention shown is floor supported, though other support mechanisms as well as smaller scale table top versions and attachments versions are contemplated herewith, with a frame that holds a portion receiving table 5, a portioning table guard 4, a close off bracket 6, an electrical control panel 3, and a product hopper 12. In the operation, the device is started by placing semi solid material into the product hopper 12, by lifting the hopper access cover 1 and placing the semi-solid material into the product hopper 12. When sufficient material is in the product hopper 12 such as a level roughly between half full to just below the upper rim of the product hopper 12, the hopper access cover 1 is closed and operation begins and the auger drive motor 13 is started. The electrical control panel 3 is coupled to the device drive, sensors, and outputs to control the exemplary embodiment and provide necessary safeguards and status indication. Electrical communication with the components may be completed through wired or wireless connections (not shown).

Typical safeguards can be included to prevent the auger drive motor 13 from operating while the hopper access cover 1 is opened. Further, the status of the instant invention may be displayed on the electrical control panel 3 or on a human machine interface (HMI) device 10, a non-limiting example being a touch screen that can be optionally provided in conjunction with the electrical control panel 3. The invention as depicted is connected to electrical power and in this exemplary embodiment a compressed air source, but could be also hooked to other power and fluid inputs non-limiting example being for instance a hydraulic power source or operation with servo drives that would provide the same operation without departing from the spirit of the invention.

The operator goes to the electrical panel 3 and, in the exemplary embodiment, activates the HMI 10 in conjunction with a control processor (not shown) having both input sensors and output devices which are typically controls for at least one of such elements as, but certainly not limited to, air valves, motor drive control devices, lights, and motion control devices. The HMI 10 and the control processor can monitor and display the operating status of the associated components. In alternate exemplary embodiments, simplified analog controllers may be utilized, with a simplified operational switch (not shown) on the electrical panel 3. This simplified control could include for example, but is certainly not limited to, eliminating the need for the full control panel by making the auger drive motor a manually started auger drive motor and the cutter device timing control would not have a touch screen input with a computerized output timed by the computer but instead have a pneumatic timing device that would be able to set the time period between cuts with for example a manual adjustment knob.

This combination of an HMI 10 and a control device in the exemplary embodiment is also capable of activating and executing an at least one stored algorithm or program in a memory, which is typically referred to as a recipe, this ability improving efficiency and ease of use, though both the HMI 10 and control device with memory storage are optional elements to the instant invention. This recipe or any one of multiple stored recipes will then be selected and entered to run. The recipe will control the various operations to extrude the semi-solid materials and also be able to cut regular lengths of this extruded semi solid materials into portions or pieces based on the desired output stored with the recipe. The diameter and shape of the pieces is determined by the shape of the discharge orifice of die block 131 and the length of the piece will be determined by the length of the part that is allowed to exit beyond the die block 131 orifice by the extrusion process of the invention and die block 131 of the invention before being cut, as further explained in relation to FIGS. 3-4B below.

Figure 3:
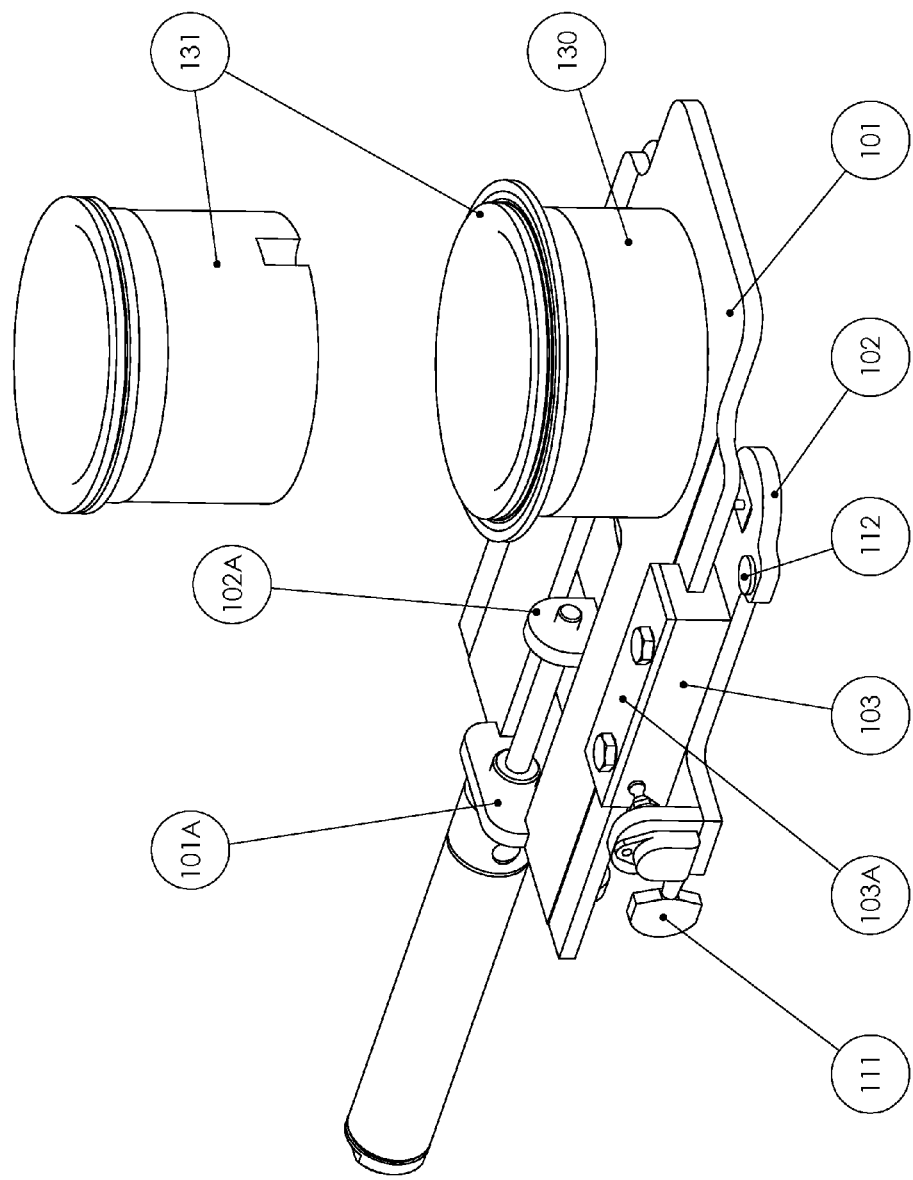
FIG. 3 shows a side top isometric view of an exemplary embodiment of a cutter assembly of an exemplary embodiment of the invention, complete with cutter actuator device, frame mount, sliding cutter, die holder with die as well as another die above in the orientation that it can be placed into the die holder and wire cutter tensioner.
Figure 3A:
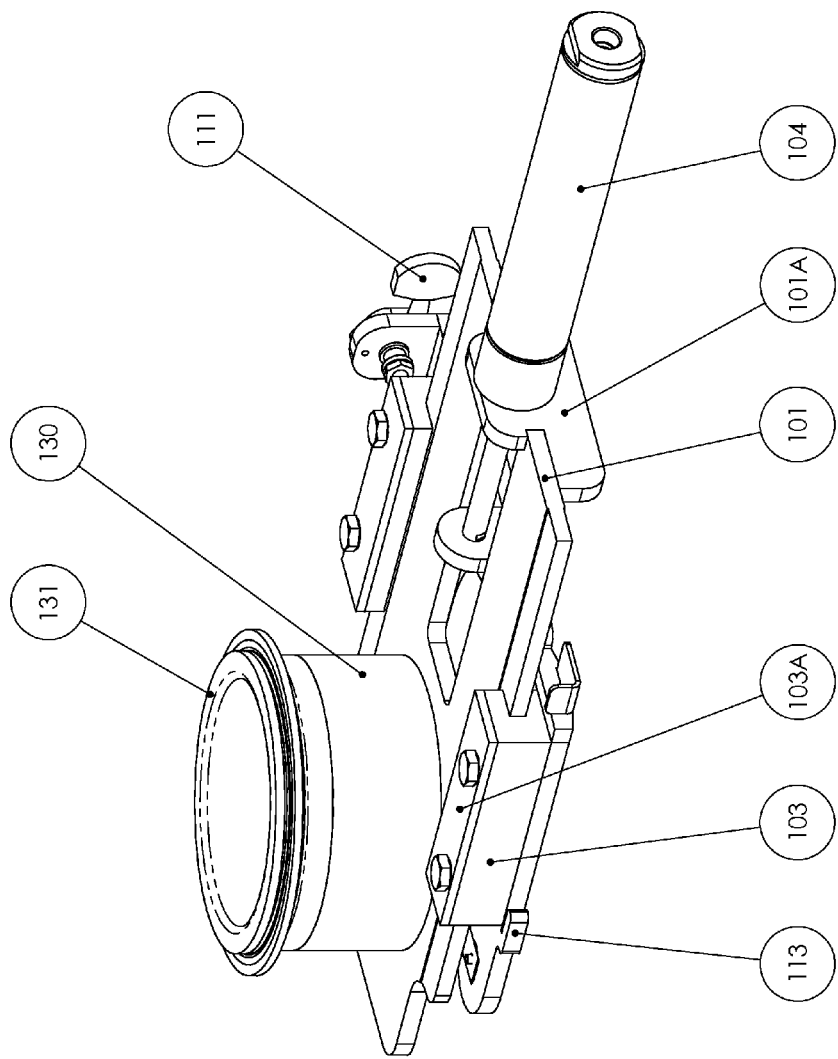
FIG. 3A shows a top isometric view of an exemplary embodiment of a cutter assembly of the invention from a different orientation, with cutter actuator device, frame mount, sliding cutter, die holder, wire cutter tensioner, wire capstan.
Figure 4:
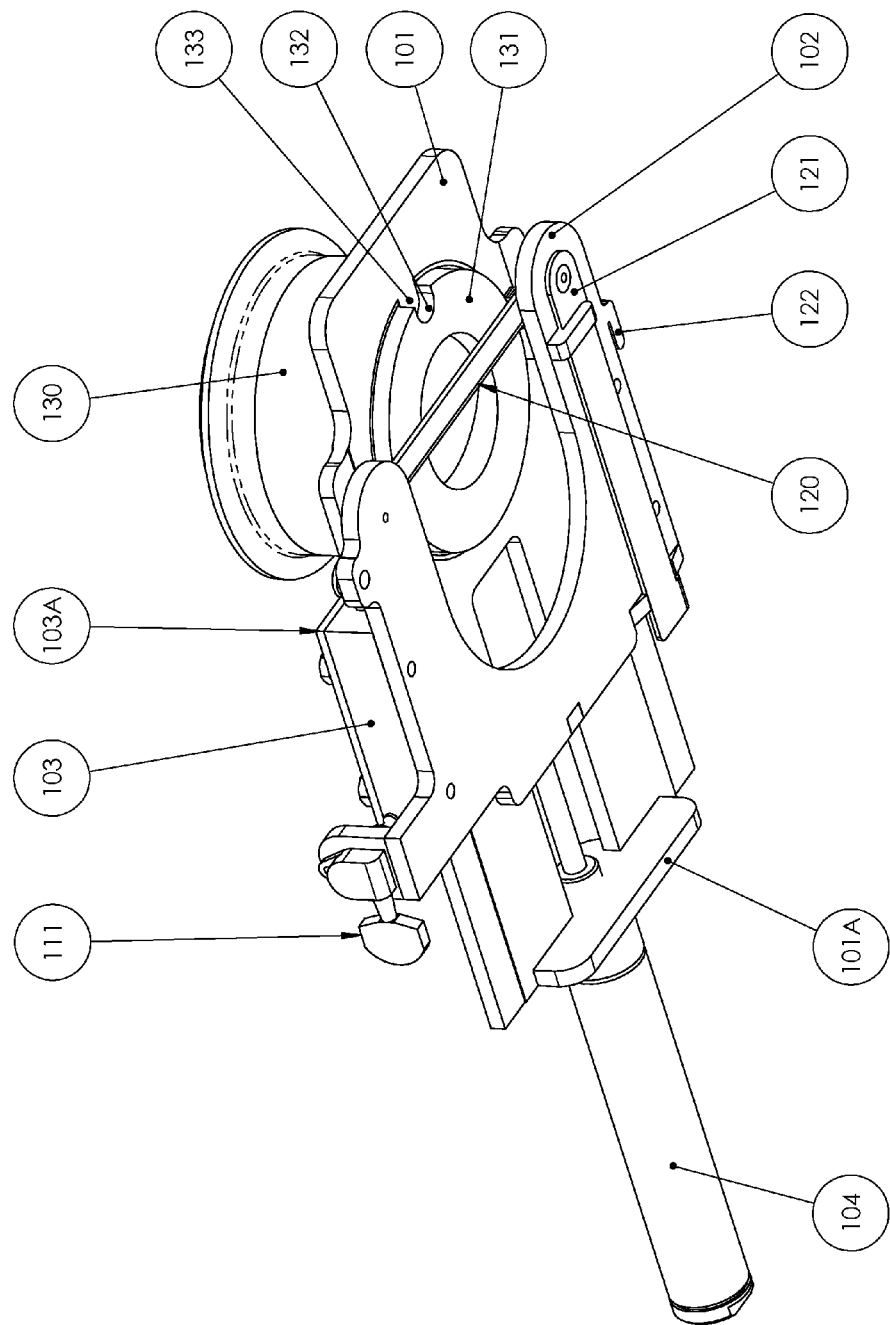
FIG. 4 shows a side bottom isometric view of the cutter of FIG. 3 with an extruder die with the die indexing detent located to the alignment protrusion, the cutter blade, and the tensioner device of the cutter blade.

As best seen in FIGS. 1-2A and 5, the HMI 10 and control device will control or set into action the coordinated movements of the product drive auger 11 with the mounted auger entry spiral 15 and hopper side wall scraper 16 and the exemplary embodiments of the cutter assembly of FIGS. 3 and 4. This algorithm or program will typically comprise of settings for the auger drive motor 13, the cutter assembly and cutter assembly actuator as well as instructions for the operator. For instance, a non-limiting example of an algorithm or program or recipe commences with the auger drive motor 13 being set in motion where it will rotate in a clockwise motion when viewed from top or above the auger. This clockwise rotation will rotate the product drive auger 11 and, thru the assistance of auger entry spiral 15, will entrain and bring the semi-solid medium down into the initial larger portion of the product drive auger 11 and then thru additional rotation further move the semi-solid material into the smaller portion of the product drive auger 11 where it will continue to move down the auger tube 18. When the semi-solid materials reach the bottom of the auger tube 18 the semi-solid materials will flow towards the upper open receiving end portion of the die block 131. Further rotation of the auger drive motor 13 auger drive shaft 14, product drive auger 11 will force or move more semi solid materials down into the auger tube 18 and into the die block 131 to the point where the semi-solid materials will flow thru die block 131 and start to emerge or extend out of die block 131.

The exemplary embodiment of the instant invention is shown as a "four way" auger combination of an auger entry spiral 15 and sweeper arm 16 that skim the side of the hopper 12 to scrape the hopper wall then with the helix of the auger entry spiral 15, the semi-solid material or medium is brought down towards the opening of the auger entry area 15.1. This helix in the spiral arm 15 is also open so as to try to bring down medium but also bring it down in such a manner so that air may escape while it is brought down. Once the material comes down to the auger entry point 15.1 it is taken into the coarse pitch area 15.2 of the auger 11 and then carried down to the fine pitch area of the lower auger section 15.3. In the upper auger section 15.1 the auger 11 being both larger in diameter as well as coarse pitch actually provides a double change in pitch going from coarse large diameter to coarse small diameter. Additionally, unlike typical augers, the spiral sweep arm 16 is attached to the auger 11, as this is typically not the case in previous designs.

In most previous instances, if there is a component of the design equivalent to the sweeper arm 16 that swept the side of the hopper, it was not attached to the actual auger. Fixing the sweeper arm to the auger in these designs was not beneficial as hoppers were typically much larger in diameter and the sweep arms would rotate with a tip velocity that would be too fast and would require a large degree of torque to operate because of its large radius and so it is typically felt to be of a detrimental procedure. In cases where sweep type arms are used they are typically driven off of a second or additional drive motor or device and not the same drive as the drive device that was used to drive the auger. The sweep augers would also be driven in a direction counter to the auger direction so as to push material to the auger. However, this counter rotation has a serious disadvantage in that it would provide or cause pulse feeding of the material to the auger. That is unacceptable spikes in the flow of material through the auger. The preferred method would be to feed or push materials to the auger in a continuous manner as is done with the instant invention. This results in more accurate apportioning of materials. In the case of the instant invention, the hopper diameter was designed or set in size so as to match the action of the sweeper arm 16 such that the sweeper arm still assists in entraining the medium and feeds it to the auger entry point 15.1 but it does not over feed or underfeed the auger entry point 15.1. It also provides further removal of air and voids from the material in the hopper.

By doing this in a twofold change in passage of the material from a wide diameter open entry to a wide diameter coarse pitch auger area and then to a finer pitch auger area it improves the removal of air in the device overall and in a more ideal manner. Rather than leaving the air removal to the point at which the medium "backs up" as it passes into the fine pitch auger area from the coarse auger area, the auger entry spiral 15 and sweep arm 16 together with the breaker bar remove most of the air prior to the switch to a smaller diameter portion of the hopper, i.e. at the change from the entry point to the auger tube section 18. Additionally, by making the pitch change go from an open volute spiral arm then into a large open auger then to the fine pitch auger the device is providing the greatest possible avenue for the removal of entrained air and this increases the accuracy of portion measurements.

There is also in use a stationary device called an at least one medium breaker bar 22 that comes down from the drive motor mount 7 and goes into the product hopper 11 and has clearance to the rotational path of the auger drive shaft 14, auger entry spiral 15, and hopper wall scraper 16. By the position of the medium breaker bar 22 and it being stationary, it prevents semi solid materials from clumping to the rotating parts of the auger drive shaft 14, auger entry spiral 15, hopper and Wall Scraper 16. In further exemplary embodiments, the at least one medium breaker bar 22 can be several bars or can be provided with "extensions" or can be provide with a cross sectional shaped profile to assist in preventing clumping and attachment and further aid in removal of air from the medium prior to entrainment with the auger 11. Variations in the shape, number and placement of the breaker bar 22 is contemplated in further exemplary embodiments of the instant invention.

Again, the principal aspect of the at least one breaker bar 22 is the prevention of semi-solid materials or mediums from clumping on the entrainment. In the exemplary embodiment shown, this is done by the medium breaker bar 22 hanging down and striking the semi-solid materials as they may become clumped onto and rotate with the auger drive shaft 14, auger entry spiral 15, hopper wall scraper 16. This striking causes the semi-solid materials to become dislodged from auger drive shaft 14, auger entry spiral 15, hopper wall scraper 16 and as well cause some of the semi-solid materials to be held from the side of the medium breaker bar 22 and put in the path of the auger entry spiral 15 so that the semi-solid materials can become entrained by the auger entry spiral 15, where the auger entry spiral 15 can force or cause the semi-solid material down into the leading edge of the product drive auger 11

The semi-solid material is thus pushed down and through the auger tube 18. As the length of the semi-solid material emerging from the die block 131 reaches the desired length as determined by the HMI 10 and the control processor settings and/or the recipe, the extruded semi solid material will be cut by the movement of the cutter slide 102 and the mounted cutter, such as but not limited to, a cutter blade 120 or cutting wire 114 components wire cutter tensioner 111, wire mount capstan 112, wire anchor 113 and cutting wire 114 as seen in the embodiments of the cutter assembly shown in FIGS. 4, 4A, and 4B and described herein below.

Figure 4A:
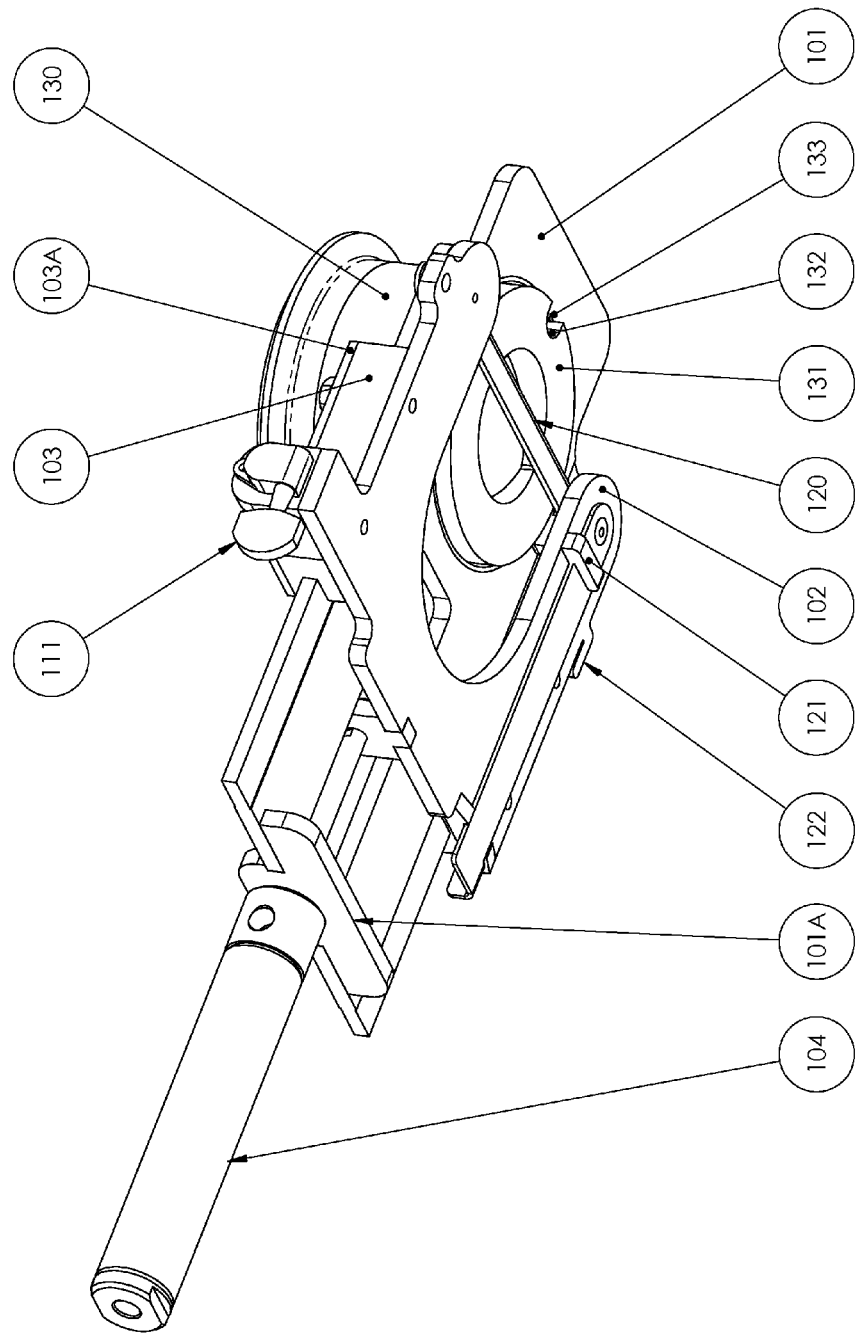
FIG. 4A shows the device of FIG. 4 in an isometric view from the other side.
Figure 4B:
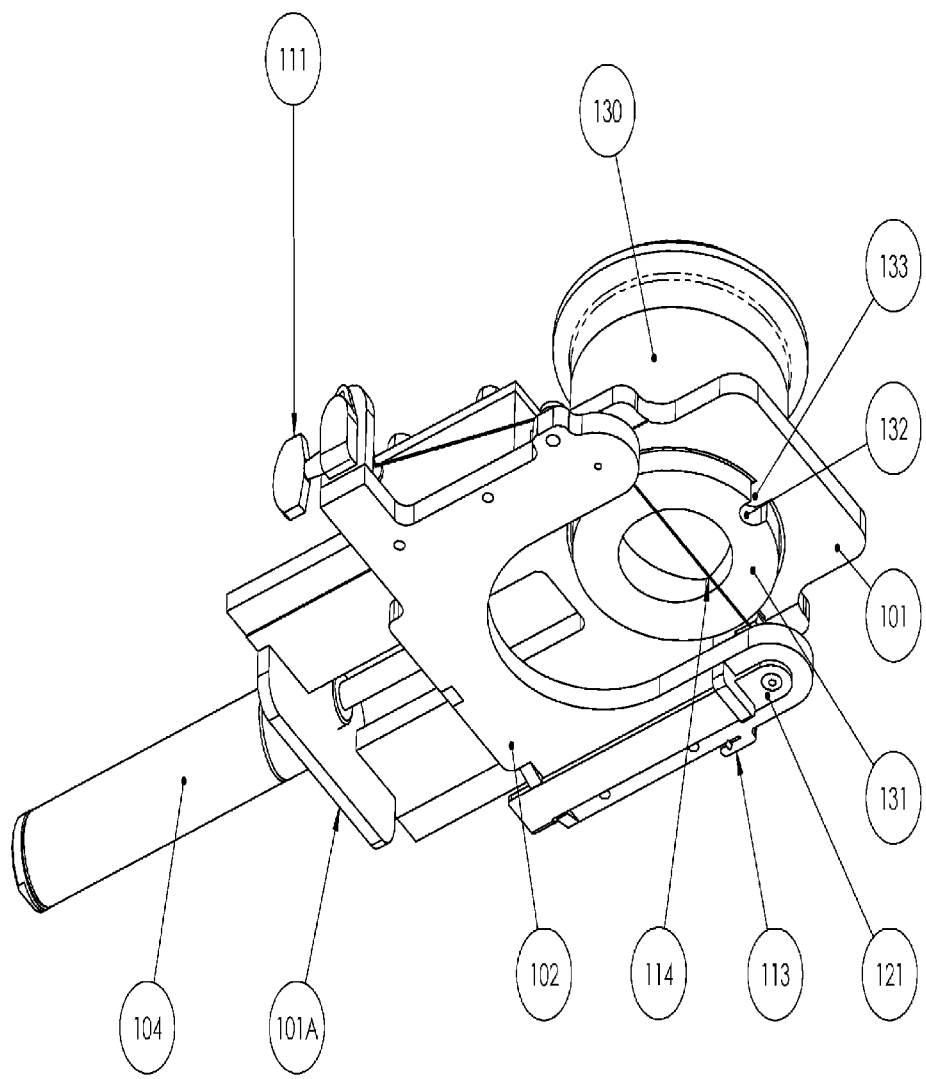
FIG. 4B shows a side bottom isometric view of the cutter showing all of the fore mentioned components of FIG. 3 plus the extruder die with the die indexing detent located to the alignment protrusion, with a cutting wire that goes over the capstan and becomes anchored in the wire anchor slot.
Figure 5:
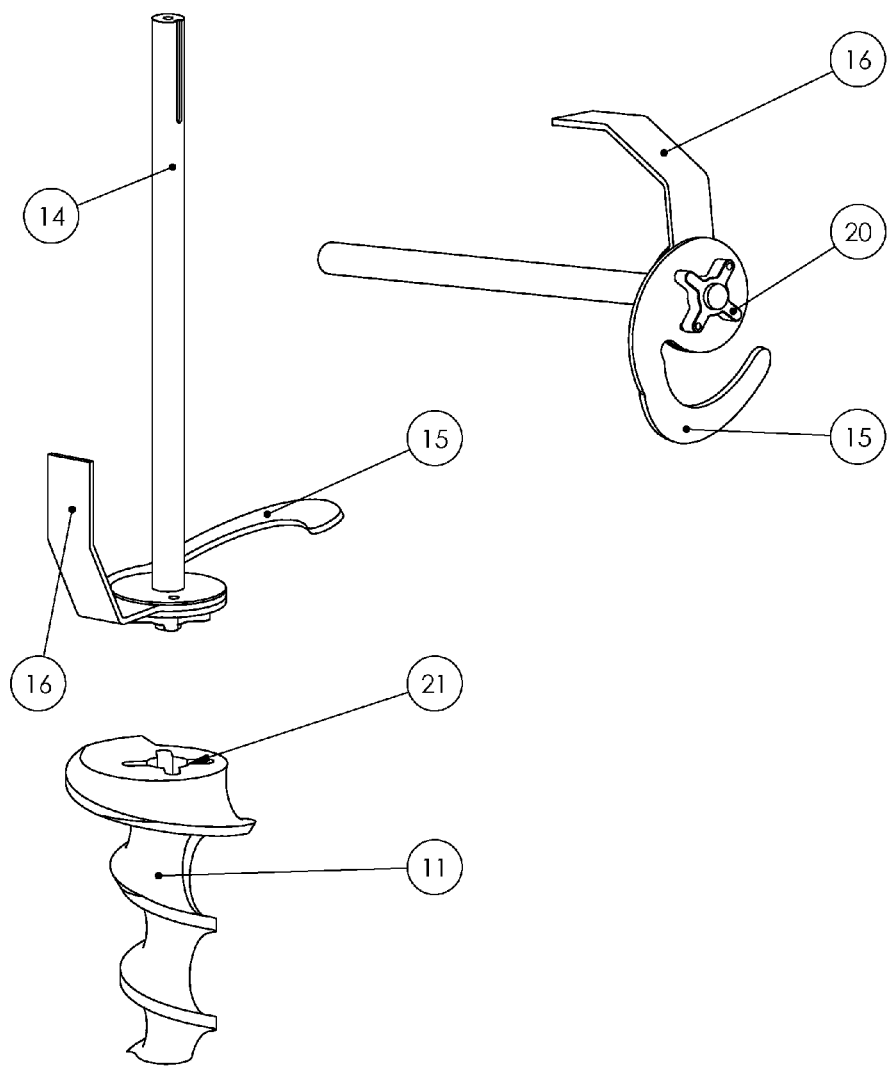
FIG. 5 shows an exploded view of an exemplary embodiment of the auger and scraper of the invention, the auger drive shaft, hopper scraper, auger entry spiral as well as means of the coupling of the auger drive shaft to the auger being shown.
Figure 631:
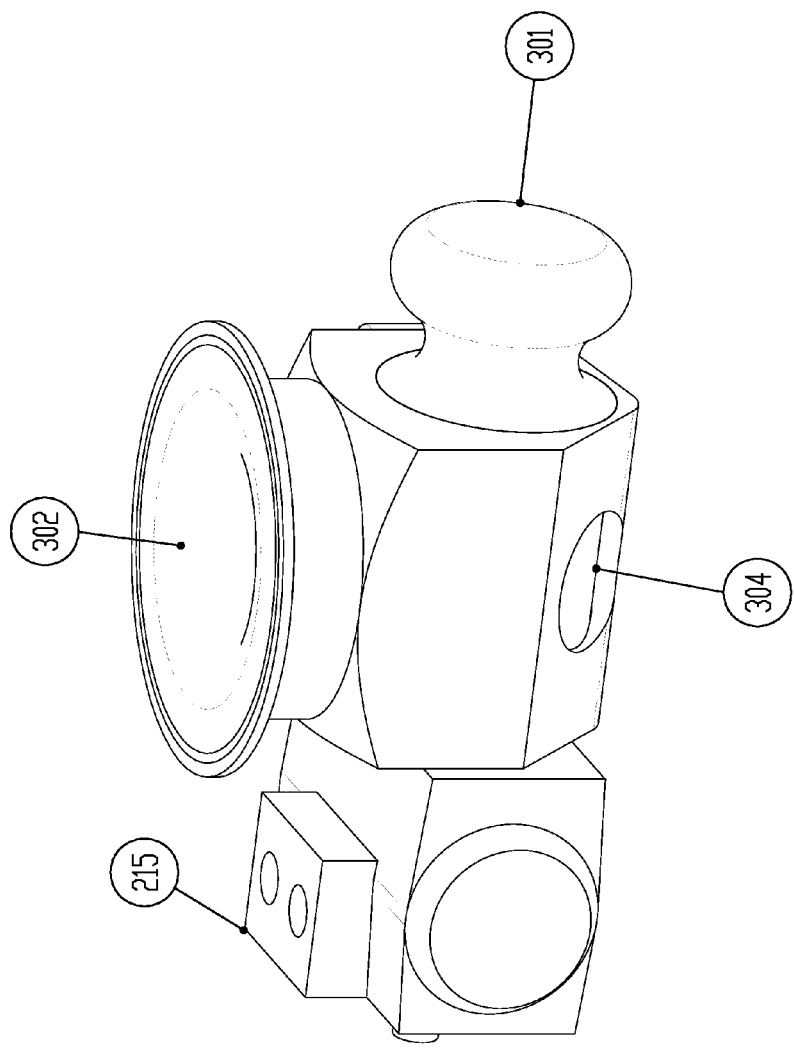

FIGS. 3-4B show exemplary embodiments of the cutting mechanism. As can be seen in FIG. 3-4B, movement of the cutter slide 102 is accomplished through the action of an actuator 104 typically, but certainly not limited, to an air cylinder or similar actuating device where the body or nose of the air cylinder or actuator 104 is secured to cutter base 101 and a cutter base to actuator mount 101A and the linear moving rod or actuating rod of the actuator 104A is coupled to the cutter slide mount tab 102A which in turn is coupled to the cutter slide 102 so that any extension or refraction of the rod of the actuator 104 results in movement of the cutter slide 102 with attached cutter device. Proper alignment of the cutter base 101 and the cutter slide 102 is maintained thru the use of cutter guide ways 103 which are made from a low friction and well wearing material that in this case is, for example but certainly not limited to, ultra-high molecular weight polyethylene (UHMW). Other materials could be used for this operation without departing from the spirit of this invention.

The cutter guide ways 103 are made with a longitudinal "U" profile which matches to the parallel machined slides 102 and are contained on the sides of the cutter base 101. The fit between the cutter slides 102 and the cutter guide ways 103 of the cutter base 101 being close enough to allow for movement and sliding clearance but not large enough so as to allow for up and down movement which would cause deviation in the cut heights of the parts which is undesirable. Cutter guide ways 103 are fixed to the cutter slide 102 by fasteners and slide mount plate 103a which provides for a surface that the fasteners may apply force to without imparting localized pressure on the cutter slides 102 which could cause distortion of the cutter guide ways 103 resulting in binding in the movement of cutter slide 102 to the mating surfaces of cutter base 101.

Figure 3B:
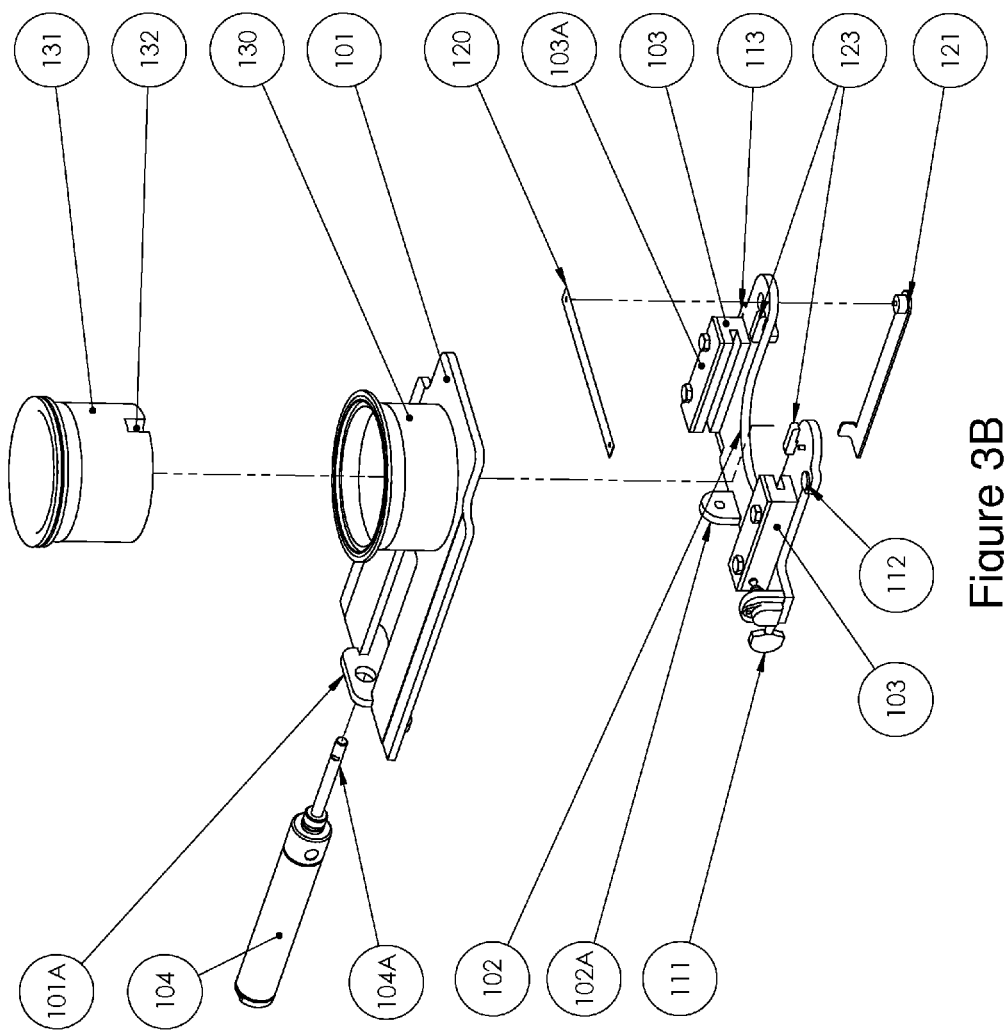
FIG. 3B shows a top isometric exploded view of the cutter assembly as in FIG. 3 complete with cutter actuator device, frame mount, sliding cutter, die holder, wire cutter tensioner, wire capstans, wire anchor as well as the cutting blade and the tension arm which tensions the cutting blade.
Figure 3C:
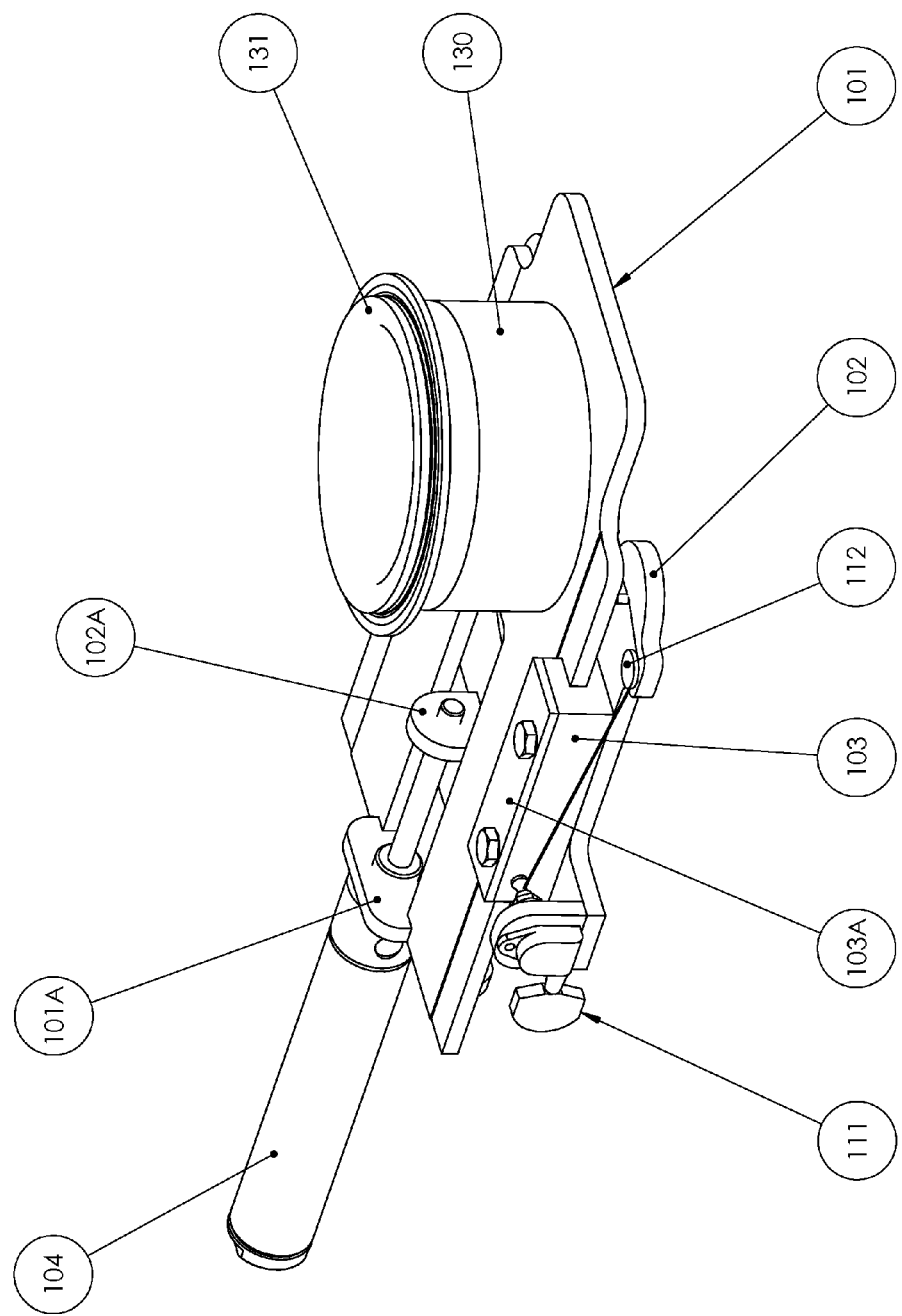
FIG. 3C shows a side top isometric view of a further exemplary embodiment of a cutter assembly with a cutter actuator device, frame mount, sliding cutter, die holder with die, wire cutter tensioner as well as a cutting wire going from the tensioner to the capstan to where it would be used to cut the semi-solid material.

As best seen in FIGS. 3-3C, the cutter assembly allows for changing of die block 131 for others of differing shapes and extrusion sizes by simply lifting out of the die block 131 from the die holder 130 when the cutter assembly 24 is off of the bottom of the auger tube 18. The coupling of the die holder 130 to the auger tube 18 is done thru the lower retaining clamp 19b. The use of this lower retaining clamp 19b allows for removal of the 130 die holder and changing of the die as well the use of the lower retaining clamp 19b to also allow for the attachment of secondary attachments to the invention so that one can switch the use of the invention from one of portioning semi solid materials onto a sheet pan or tray to portioning or depositing of materials such as fruit filling materials such as cherry filling into tart shells or for a nozzle to be used to extrude out soft or stiffed grated cheese into pepper sleeves as one non-limiting example.

Figure 7:
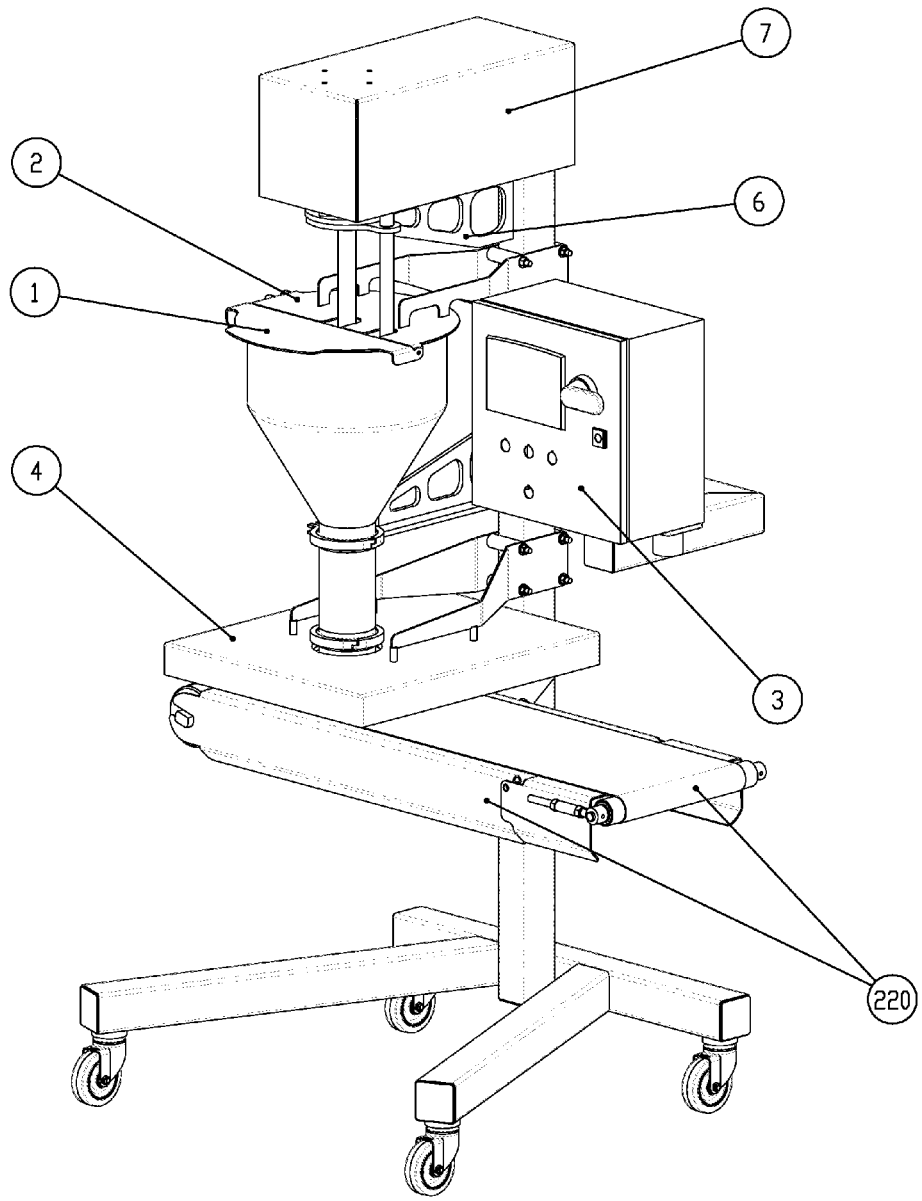
FIG. 7 shows an exemplary embodiment with an attached discharge conveyor.

Further embodiments showing these secondary attachments is shown in further detail in relation to FIGS. 6-7.

With respect to the embodiment shown in FIGS. 3-3C, a different die block 131 may be dropped into the die holder 130 and aligned with the alignment detent 132 of the die block 131 lining up to the die holder 130 alignment protrusions 133. Once the alignment detent 132 of the die block 131 is aligned with the alignment protrusion 133 of the die holder 130 the die will drop in place and the cutter assembly 24 may be fastened to the bottom of the auger tube 18 by use of lower retaining clamp 19b, as best viewed on FIGS. 3B and 4B.

The cutter assembly 24 also contains a cutter blade tensioner 121 which is eccentrically mounted to the shaft so that as it rotates it will tension the cutter blade 120. The cutter blade tensioner 121 is also able to rotate to a point where it is no longer retained by the cutter slide 102 and may be dropped out for cleaning or for a lubricant to be applied to its shaft. This can be seen best in FIG. 3B.

FIGS. 4-4B show exemplary embodiments of the cutting device 34. The cutter slide 102 is able to utilize either the cutter blade 120 with cutter blade tensioner 121 or it may use wire cutter tensioner 111, wire mount capstan 112, wire anchor 113 and cutting wire 114 to cut the products being extruded depending on the materials that are being extruded. In the case of the soft semi solid materials it may be preferred to use the wire as the cutting device FIGS. 4 and 4A show the exemplary embodiment of the cutting device 34 employing the cutter blade 120. The cutting blade 120 is generally, but is certainly not limited to, stiff materials where it may be preferred to use the cutting blade. The blade 120 is typically used on non-sticky or less sticky mediums that cut with little to no adhesion to the blade. It is often that case where a device such as this may be required so as to match the product being cut into portions.

FIG. 4B shows an exemplary embodiment of the cutting device 34 employing the cutting wire 114. The cutting wire 114 is meant for, but is certainly not limited to, materials that are typically of a sticky type nature, the cutting operation is much the same as a wire cutting thru cheese where it just passes thru and there is no adhesion of the medium to a wide blade cutter such as a knife blade where the blade surface beyond the cutting edge produces drag and detracts from a simpler cutting process as compared to a thin wire where the wire just passes thru the medium.

FIGS. 6-7 show further exemplary embodiments of the instant invention that provide secondary attachments. Through the above configuration of different discharge devices or secondary attachments to the invention can be added. As an example these may include but are not be limited to a fitting to allow for the portions discharged to be pushed thru a nozzle. This would be typical for the use of filling materials such as custard being put into doughnuts, soft or firm cheese into pepper skins, or potato stuffing into the hollowed out shells of potatoes. This attachment or other secondary attachments would be able to be attached at lower attachment connection 19B.

Examples of secondary or accessory cutters are shown in FIGS. 6A1-6B3, wherein in non-limiting exemplary embodiments the cutter is of a rotary cutter 200 or 300 where there is a housing 212, 312 and a rotary valve 201, 301, respectively. In both instances, a motivator 215 is provided to automatically turn the rotary valve 201, 301.

In FIG. 6A1-6A3 there are ports 202, 204 in the housing 212 of the rotary valve 201, where a first or entry port 202, as best shown in FIG. 6A3, will open to admit material flow and the further or exit port 204 of the rotating spool valve 201 is provided for the medium to be discharged from. In an open state, both ports 202, 204 are open permitting flow into the rotary valve 201. In this exemplary embodiment, the rotary valve 201 is rotated 90 degrees or through an angle sufficient so that the valve will seal off the passage 210 at both the first or entry port 202 and further or discharge port 204 of the rotating spool valve 201 to move to a closed state. This valve being better suited to more fluid or less viscous mediums where a double seal would provide the best seal to stop the flow of materials to be portioned.

In FIGS. 6A1-6A3 a further exemplary embodiment of a secondary or accessory cutter is provided. The cutter is a rotary valve cutter, but in this exemplary embodiment the rotary valve 301 operates from open to closed position such that only the discharging port 304 of the valve 301 will be closed in its entirety upon rotation of the valve 301 to the closed position. In FIGS. 6B1-6B3, a rotary valve 301 is provided with a rotary valve body 312 and a motivator 205. The ports 302, 304 are provided with an angled passage 310 the upper inlet port 302 of the valve 301 will be opened up so that there is a clear inlet passage 310 from inlet port 302 of the valve body 310 to the inlet side of the valve 301 when the discharge port 304 of the valve 301 is in either the open or the closed position, as most clearly shown in FIG. 6B3. In this embodiment the inlet side 302 will always remain open and clear. This embodiment is typically used when the material to be portioned is of a more viscous nature and it does not need the added rotational energy required to shear cut the materials in both ports upon closing. It is also typically used when there is a need to reduce as much as possible the amount of cutting of pieces of inclusion in the materials to be portioned. A non-limiting example being cookie dough with large chunks of fruits or candies in it where seeing cut pieces are considered as being visually not as pleasing as viewing whole pieces.

FIG. 7 shows an exemplary embodiment with an attached discharge conveyor. Another option for an exemplary embodiment of the invention is the replacement of the table 5 with a discharging conveyor 220 where the cutter assembly 24 would cut the portions and drop the portions onto a conveyor rather than the table 5 or in addition to a table or onto a revolving or conveyed tray from an exemplary embodiment identical to those shown in FIGS. 1-3 above.

Every device needs to be taken apart and cleaned so that residual materials can be removed and/or materials that are in the device do not harden, solidify or form health hazards due to decomposition or bacteria infestation. In the case of this exemplary embodiment of the instant invention, disassembly is carried out by removal of both the upper and lower retaining clamps 19a and 19b. The lower retaining clamp 19b holds the auger tube 18 to the cutter assembly 24. When this retaining clip 19b is removed the cutter assembly 24 will be able to drop down to rest on the Receiving Table 5. When the upper retaining clip 19a is removed it allows the combined parts of the product drive auger 11, product hopper 12, auger entry spiral 15, hopper side wall scraper 16 and auger tube 18 to come off of the product hopper mounting base 17. The combination of the product drive auger 11, product hopper 12, auger entry spiral 15, and hopper side wall scraper 16 and auger tube 18 may then be swung out from under the stationary hopper cover 2 as well as away from the product hopper mounting base 17 so that it can be removed from the frame of the invention.

Once removed the product drive auger 11, product hopper 12 and auger tube 18 can be cleaned and semi-solid materials be removed. The remaining auger drive shaft 14 will stay behind as it is secured to the auger drive motor 13 where it can be cleaned in place as required. Once cleaned the combination of the product drive auger 11, product hopper 12, auger entry spiral 15, hopper side wall scraper 16 and auger tube 18 may be re-assembled and put back in place. Replacing the assembly into the frame of the invention will require alignment of the coupling that allows detachment of the auger drive shaft 14 and the product drive auger 11 to which the auger entry spiral 15 and hopper side wall scraper 16 are both attached to. This coupling is attached to the bottom of the auger drive shaft 14 and has surfaces that protrude laterally and that will engage in the opposing female drive coupling socket 21 of the product drive auger 11 which will be of the matching shape but slightly larger in size so as to allow for ease of assembly as well as clearance to allow for manufacturing or operational misalignment of the male drive coupling 20 and female drive coupling socket 21 as the product drive auger 11 rotates in the product hopper 12 and auger tube 18. The use of couplings in industry is typically to provide for power transmission and in this case to provide for both transmission of rotational movement as well as provide for a means of disassembly. There are several types of coupling design that can be substituted for those shown without departing from the spirit of the invention.

To properly reassemble product drive auger 11, product hopper 12, auger drive motor 13, auger drive shaft 14, auger entry spiral 15, hopper side wall scraper 16 and auger tube 18 to product hopper mounting base 17 one must be certain to align the protrusions of the male drive coupling 20 to the openings of the female drive coupling socket 21. Once the protrusions of the male drive coupling 20 are matched to the openings of the female drive coupling socket 21, the male drive coupling 20 may be inserted into the female drive coupling socket 21. Then the assembly of product drive auger 11, product hopper 12, auger drive motor 13, auger drive shaft 14, auger entry spiral 15, hopper side wall scraper 16 and auger tube 18 may be moved into place and fastened to product hopper mounting base 17 by use of upper retaining clip 19a. The cutter assembly 24 may also be removed and cleaned as required and placed at the bottom of auger tube 18 and fastened by use of the lower retaining clip 19b. The details of the assembly of the product drive auger, the auger drive shaft and the auger entry spiral and hopper side wall scraper can be best seen in FIG. 5.

The embodiments and examples discussed herein are non-limiting examples. The invention is described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A multi stage auger system providing removal of air and void spaces from semi-solid material in an extrusion system comprising:
   a motor coupled to an auger drive shaft and an electrical control panel;
   a product hopper with a first diameter opening tapering to a second smaller diameter opening and coupled to an auger tube at the second smaller diameter opening;
   an auger entry spiral with a substantially helical shape and at least one sweep arm coupled to the auger entry spiral and driven by the motor, the auger entry spiral and the at least one sweep arm skimming inside the product hopper to entrain the semi-solid materials from a hopper wall and, through the helical shape of the auger entry spiral, moving the semi-solid materials through the hopper from the first diameter opening towards the second diameter opening in an auger entry area within the hopper, wherein during such entrainment and movement of the semi-solid material by the auger entry spiral and the at least one sweep arm there is a space left between the auger entry spiral and the at least one sweep arm to remove air and voids from the semi-solid material through the entrainment and movement under increasing pressures at an exit of the auger tube;

an least one stationary breaker bar disposed and extending at least into the product hopper, wherein the semi-solid material being moved by the auger entry spiral and the at least one sweep arm is passed across the at least one stationary breaker bar such that the breaker bar further assists in avoiding adherence of excess semi-solid material to the rotating auger entry spiral and sweep arm and further aids in removal of air from and movement of the semi-solid material down and thru the extrusion system;

an auger coupled to the auger entry spiral and the at least one sweep arm, the auger having a first section with a first coarser pitch providing further removal of the air and the void spaces through the movement and agitation and a second finer pitch providing a further movement under higher pressures at the exit of the auger tube; and a die member coupled to the exit of the auger tube whereby the semi-solid materials are extruded through the die member.

2. The device of claim 1, further comprising a human machine interface (HMI) with a controller and memory storing at least one program for operating the system.

3. The system of claim 2, further comprising at least one sensor input and at least one output in communication with a controller and displaying an at least one status of the system on the HMI.

4. The system of claim 3, wherein the HMI is a touch screen.

5. The system of claim 3, wherein at least one program for operating the system further comprising at least one of: an at least one rotational speed, an at least one product description, an at least one production rate in cuts per minute, an at least one auger speed and an at least one counter function.

6. The system of claim 1, wherein the auger is conical in the first section.

7. The system of claim 1, further comprising a reciprocating cutting mechanism.

8. The system of claim 1, further comprising a cutting mechanism with a cutting blade.

9. The system of claim 1, further comprising a cutting mechanism with a cutting wire.

10. The system of claim 1, wherein a single motor drives both the auger and the at least one sweep arm.

11. The system of claim 1, wherein the at least one sweep arm moves in the same direction as the auger.

12. The system of claim 1, further comprising a cutting mechanism cutting portioned pieces of the semi-solid material after being extruded through the die member.

13. The system of claim 12, wherein the cutting mechanism is at least one of an at least one blade, an at least one wire, and an at least one valve cutter.

14. The system of claim 12, further comprising an exit nozzle coupled to the die member.

15. The system of claim 12, further comprising at least one of a conveyor, a collection tray or a conveyor with collection trays.

16. The system of claim 1, wherein the at least one stationary breaker bar further comprises at least one of: multiple breaker bars, at least one breaker bar with extensions, and a breaker bar with a cross sectional shaped profile.

17. An auger processing semi-solid material through extrusion with a cutting mechanism comprising:

a motor coupled to an auger drive shaft and an electrical control panel;

a tapered product hopper with a first end and a second end, the second end having a smaller diameter than the first end, and coupled to an auger tube at the second end;

an auger entry spiral with a substantially helical shape and at least one sweep arm coupled to the auger entry spiral and driven by the motor, the auger entry spiral and the at least one sweep arm providing movement of the semi-solid material into the auger tube;

an least one stationary breaker bar disposed and extending at least into the product hopper, wherein the semi-solid material being moved by the auger entry spiral and the at least one sweep arm is passed across the at least one stationary breaker bar such that the breaker bar further assists in avoiding adherence of excess semi-solid material to the rotating auger entry spiral and sweep arm and further aids in removal of air from and movement of the semi-solid material down and thru the extrusion system;

an auger coupled to the auger entry spiral and the at least one sweep arm, the auger having a first section with a first coarser pitch providing a further movement from the auger entry spiral through the auger tube and a second finer pitch providing a further movement under higher pressures at an exit of the auger tube;

a die member coupled to the exit of the auger tube; and a cutter assembly mounted to the die member and having a cutter base with at least one cutter slide and a cutter mount with at least one cutter way, the at least one cutter slide moving within the at least one cutter way by the movement of an actuator, the movement of the actuator moving the cutter base below the die member to cut extruded semi-solid materials from the auger; and a product collection device collecting the cut extruded semi-solid material.

18. The auger of claim 17, wherein the product collection device is at least one of a table, a conveyor, a tray and a conveyor with trays.

19. The auger of claim 17, wherein the cutter assembly further comprises a removable die member which is exchangeable for dies with differing shapes and extrusion sizes by lifting a die block from a die holder in the die member when the cutter assembly is removed from a bottom of the auger tube.

20. The auger of claim 17, wherein the cutter assembly further comprises an at least one cutting blade and a cutting blade tensioner assembly.

21. The auger of claim 17, wherein the cutting device further comprises a wire cutter tensioner, a wire mount capstan, a wire anchor and at least one cutting wire.

* * * * *